United States Patent [19]
Lebas et al.

[11] Patent Number: 6,089,983
[45] Date of Patent: Jul. 18, 2000

[54] TORSION DAMPING DEVICE, ESPECIALLY FOR USE IN A MOTOR VEHICLE

[75] Inventors: Gilles Lebas, St. Ouen; Gérard LeFevre, Saleux, both of France

[73] Assignee: VALEO, Paris, France

[21] Appl. No.: 08/760,286

[22] Filed: Dec. 4, 1996

[30] Foreign Application Priority Data

Dec. 4, 1995 [FR] France ................................. 95 14300

[51] Int. Cl.$^7$ ....................................................... F16D 3/14
[52] U.S. Cl. ............................................. 464/68; 192/204
[58] Field of Search ...................... 464/66, 68; 192/204, 192/213.22; 74/574

[56] References Cited

U.S. PATENT DOCUMENTS

| | | | |
|---|---|---|---|
| 4,883,156 | 11/1989 | Rohrle et al. | 192/204 |
| 4,899,862 | 2/1990 | Graton et al. | 192/204 |
| 5,014,842 | 5/1991 | Graton et al. | 192/204 |
| 5,117,959 | 6/1992 | Graton | 464/68 |
| 5,169,357 | 12/1992 | Graton | 464/68 |
| 5,217,409 | 6/1993 | Dalbiez | 464/68 |

FOREIGN PATENT DOCUMENTS

| | | |
|---|---|---|
| 2628808 | 9/1989 | France . |
| 2646692 | 11/1990 | France . |
| 2674592 | 10/1992 | France . |
| 4417660 | 12/1994 | Germany . |

*Primary Examiner*—Eileen Dunn Lillis
*Attorney, Agent, or Firm*—Liniak, Berenato, Longacre & White

[57] ABSTRACT

A torsion damping device couples together an input element, such as a clutch friction wheel, and an output element comprising a hub. The damping device comprises a main damper and a predamper. The main damper comprises two guide rings arranged axially on either side of a damper plate. Each of the two dampers includes an axially acting friction device, and the damper plate meshes, with a circumferential clearance, with the periphery of a hub ring formed on the outer periphery of the hub. Both of the friction devices are incorporated in a single component, which comprises a first friction ring surrounding a second friction ring, and which includes radial arms which join the two friction rings together in such a way that the friction rings rotate together but are displaceable axially with respect to each other due to axial deformability of the radial arms.

11 Claims, 2 Drawing Sheets

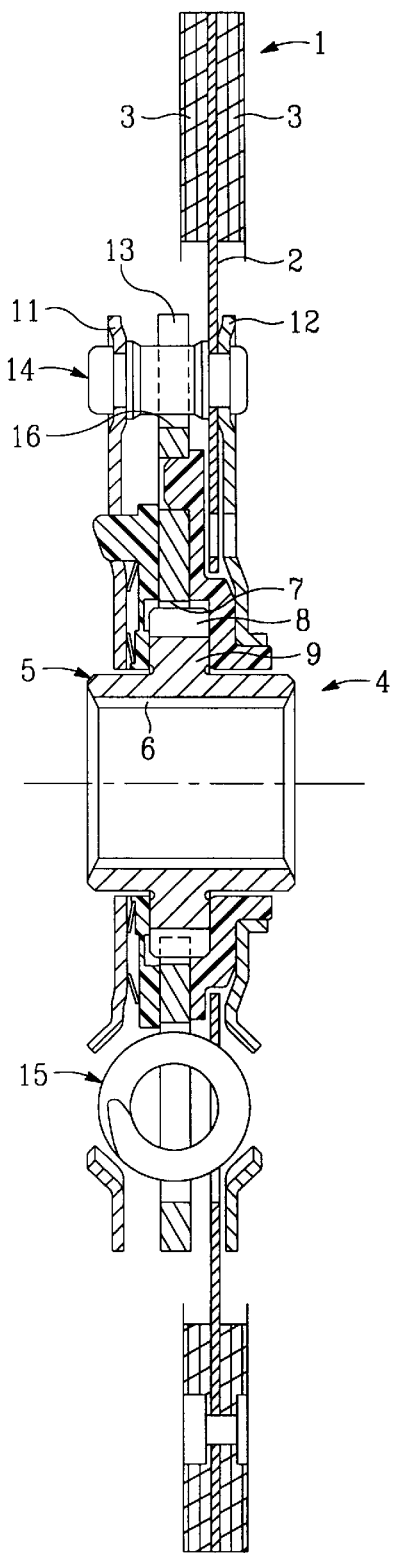
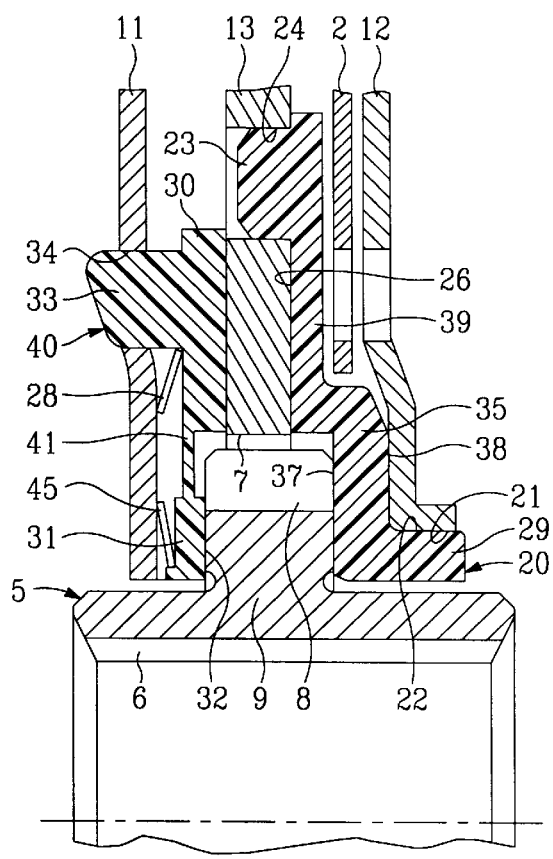

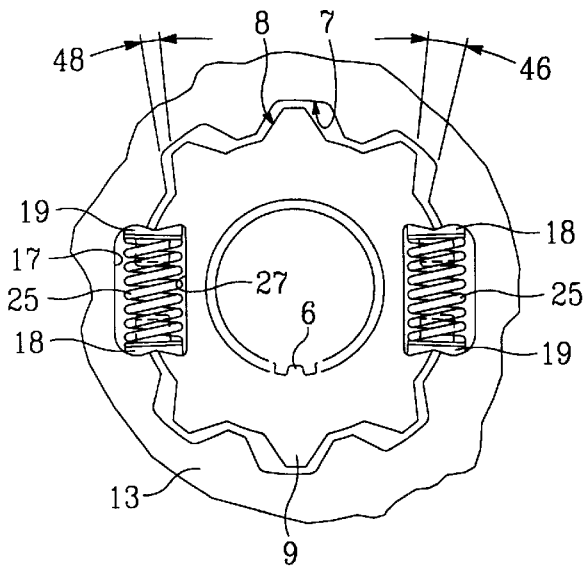
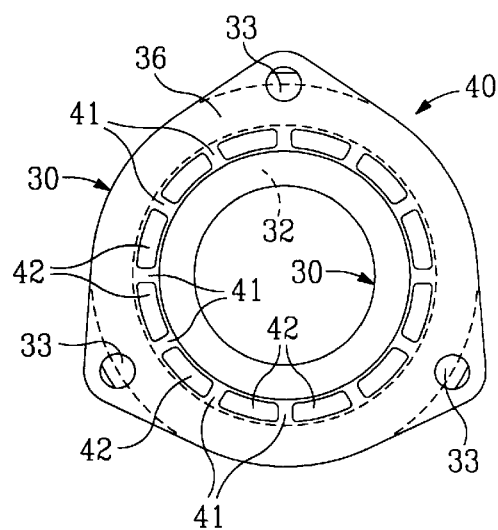
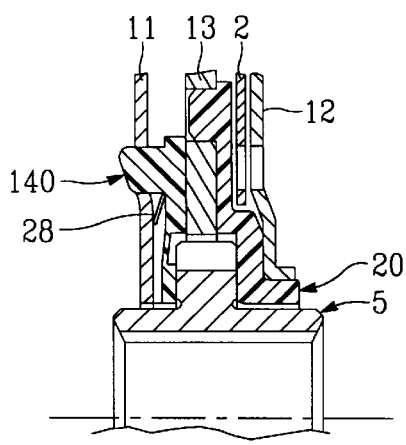
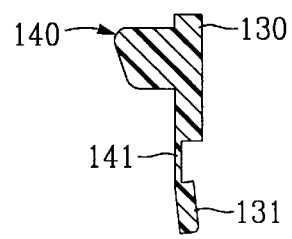

ated on kinematically directly by the input element, and secondly, a predamper having circumferentially acting resilient means and being placed directly upstream of the output element which comprises a hub, wherein the main damper includes two guide rings disposed axially on either side of a damper plate, the circumferentially acting resilient members associated with the main damper acting between the two guide rings and the damper plate flanked by the guide rings, the main damper resilient members being mounted within apertures in facing relationship with each other and formed in the guide rings and the damper plate, the circumferentially acting resilient members of the predamper being less stiff than those of the main damper and acting between the damper plate and the hub, and wherein each of the two dampers, i.e. the main damper and the predamper, includes an axially acting friction device associated with its corresponding resilient members, and wherein the damper plate meshes with the periphery of a hub ring, with a circumferential clearance.

TORSION DAMPING DEVICE, ESPECIALLY FOR USE IN A MOTOR VEHICLE

FIELD OF THE INVENTION

The present invention relates to torsion damping devices, especially for use in motor vehicle clutches.

More particularly, the invention relates to a torsion damping device which is disposed between two rotatable elements, namely an input element and an output element, the torsion damping device comprising, firstly, a main damper having circumferentially acting resilient means and being acted on kinematically directly by the input element, and secondly, a predamper having circumferentially acting resilient means and being placed directly upstream of the output element which comprises a hub, wherein the main damper includes two guide rings disposed axially on either side of a damper plate, the circumferentially acting resilient members associated with the main damper acting between the two guide rings and the damper plate flanked by the guide rings, the main damper resilient members being mounted within apertures in facing relationship with each other and formed in the guide rings and the damper plate, the circumferentially acting resilient members of the predamper being less stiff than those of the main damper and acting between the damper plate and the hub, and wherein each of the two dampers, i.e. the main damper and the predamper, includes an axially acting friction device associated with its corresponding said resilient members, and wherein the damper plate meshes with the periphery of a hub ring, with a circumferential clearance.

BACKGROUND OF THE INVENTION

A torsion damping device as set forth above is described for example in French patent specification No. FR 2 628 808A. In that document, the friction devices associated with the main damper, and those associated with the predamper, comprise two friction rings, each of which is associated with a Belleville ring that biases them in the axial direction. These two friction rings are coupled with the guide ring on which the Belleville rings bear, for rotation with that guide ring, and, to that end, the friction rings have drive means such as an axial portion which is either in the form of a sleeve with crescent-shaped portions, or in the form of lugs.

DISCUSSION OF THE INVENTION

An object of the present invention is to provide a torsion damping device of the above mentioned type in which the number of components is reduced, and the components themselves are of simplified form.

In accordance with the invention, a torsion damping device which is disposed between two rotatable elements, namely an input element and an output element, the torsion damping device comprising, firstly, a main damper having circumferentially acting resilient means and being acted on kinematically directly by the input element, and secondly, a predamper having circumferentially acting resilient means and being placed directly upstream of the output element which comprises a hub, wherein the main damper includes two guide rings disposed axially on either side of a damper plate, the circumferentially acting resilient members associated with the main damper acting between the two guide rings and the damper plate flanked-by the guide rings, the main damper resilient members being mounted within apertures in facing relationship with each other and formed in the guide rings and the damper plate, the circumferentially acting resilient members of the predamper being less stiff than those of the main damper and acting between the damper plate and the hub, and wherein each of the two dampers, i.e. the main damper and the predamper, includes an axially acting friction device associated with its corresponding resilient members, with the said damper plate having, at its inner periphery, internal splines meshing, with a circumferential clearance, with external splines formed at the periphery of a hub ring carried on the outer periphery of the hub, the friction devices comprising a single member which includes first friction ring surrounding a second friction ring, is characterised by the fact that the first and second friction rings are joined together by means of radial arms which are flexible in the axial direction, so that the friction rings are thereby coupled together for rotation together while being displaceable axially with respect to each other.

The first friction ring is preferably disposed axially between one guide ring and the damper plate, with the second friction ring being disposed axially between the guide ring and the hub ring, one of the two friction rings being biased elastically towards the damper plate, and the other friction ring being biased elastically towards the hub ring.

Preferably, the first friction ring is provided with axial spigots which are fitted in complementary through holes in the guide ring that faces towards it, and is biased axially towards the damper plate by a Belleville ring which bears on the said guide ring.

According to a further feature of the invention, the second friction ring is biased axially towards the hub ring by means of an axially acting resilient ring such as a Belleville ring, which bears on the guide ring that faces towards the second friction ring.

In another version, the second friction ring is biased axially towards the hub ring by prestressing of the said radial arms.

The other guide ring, i.e. the one which is located on the other side of the damper plate from the component which constitutes the friction devices is preferably centred by means of an interposed bearing, with a cylindrical engagement surface of this guide ring cooperating with a complementary cylindrical engagement surface of the bearing, this engagement surface of the bearing surrounding the hub.

Preferably, the bearing is formed with axial spigots which are fitted into complementary through holes in the damper plate, and the bearing includes an annular engagement surface which bears on the damper plate.

As will be understood from the foregoing, the number of components is reduced, the guide ring concerned being simplified and stiffened because the only through holes are those which are associated with the first friction ring. The arrangement according to the invention is therefore simple and inexpensive, the component which constitutes the first and second guide rings being preferably moulded in a suitable mouldable material.

In one embodiment of the invention, the resilient members of the predamper are mounted in pairs of slots facing towards each-other and formed in the inner periphery of the damper plate and the outer periphery of the hub ring, respectively. This arrangement is very compact in the axial direction in the region of the outer periphery of the hub.

In addition, it is possible to reduce the number of components because the bearing, which is separate from the component having the axially flexible arms in accordance with the invention, is able to serve for centring the damper plate with respect to the guide rings, in the manner described in French patent specification No. FR 2 646 692A or its corresponding U.S. Pat. No. 5,117,959.

In another version, in the manner described in the above mentioned prior art specifications, the predamper may be arranged axially on the other side of the damper plate from the single friction member which is provided in accordance with the present invention. The predamper is then located axially between the damper plate and the guide ring concerned, being radially inward of the resilient members of the main damper.

In this latter case, the predamper includes two secondary guide rings which are disposed on either side of a secondary damper plate, the resilient members of the predamper then acting between the damper plate of the main damper and the hub, and being mounted in windows which are formed, in facing relationship with each other, in the secondary damper plate and the secondary guide rings.

The secondary damper plate may be coupled in rotation to the hub, while the secondary guide rings may be coupled in rotation to the damper plate of the main damper. Again, the structures may be reversed. For more detail, reference is invited to French patent specification No. FR 2 628 808A and to U.S. Pat. No. 4,883,156, mentioned above, given that it is not essential to provide the spacing ring, since one of the secondary guide rings, which in this case is fixed to the other guide ring, for example by means of spacers, carries pins which are engaged in complementary apertures in the damper plate so as to provide coupling with the latter for rotation together.

In all embodiments, the damper plate has, at its inner periphery, internal splines which mesh (with a circumferential clearance) with external peripheral slots in the outer periphery of a hub ring, which is itself formed on the outer periphery of the hub.

The external splines of the hub ring may or may not be interrupted by the recesses in which the resilient members of the predamper are accommodated.

The various features and advantages of the invention will be understood more clearly on a reading of the following detailed description of preferred embodiments of the invention, given purely by way of illustrative and non-limiting example and with reference to the accompanying drawings.

BRIEF DESCRIPTION OF THE DRAWINGS

FIG. 1 is a view in cross section of a torsion damping device in accordance with the invention.

FIG. 2 is a view repeating part of FIG. 1 on a larger scale.

FIG. 3 is a partial plan view showing the meshed relationship of the damper plate and the hub ring in the apparatus of FIGS. 1 and 2.

FIG. 4 is a plan view of the friction remember in accordance with the invention.

FIG. 5 is similar to FIG. 2 but on a smaller scale, and illustrates a modified embodiment.

FIG. 6 is a view in cross section of the friction member in the embodiment seen in FIG. 5.

DESCRIPTION OF PREFERRED EMBODIMENTS OF THE INVENTION

With reference firstly to FIG. 1, this shows a main damper which comprises an input element 1 fixed to two guide rings 11 and 12. These guide rings are arranged on either side of a damper plate 13. The guide rings 11 and 12 are joined together by means of spacers 14, by which they are firmly secured together. Circumferentially acting resilient means, which in this example consist of helical springs, couple the damper plate 13 elastically to the guide rings 11 and 12.

The present example is concerned with a friction clutch, and in the case of the application of the torsion damper to such a clutch, the input element 1 consists of a support disc 2 of the friction wheel of the clutch. Friction liners 3 are secured on each of the opposed faces of the support disc 2, and are arranged to be gripped between the pressure and reaction plates, not shown, of the clutch. The support disc 2, carrying the friction liners 3, is attached to the guide ring 12 of the main damper, being secured to the latter by means of the spacers 14. In another version (not shown), the support disc 2 is fixed to the guide ring 12 by means of dedicated rivets.

The spacers 14 extend through apertures 16 in the form of notches, which are formed in the outer periphery of the damper plate 13. The angular displacement between the damper plate 13 and the guide rings 11 and 12 is limited by cooperation of the spacers 14 with the edges of the apertures 16.

The guide rings 11 and 12 surround the output element 4 of the torsion damping device. This output element consists of a hub 5, which is formed with internal splines 6 through which it is coupled in rotation to, in this example, the input shaft of the gearbox. Similarly, the damper plate 13 of the main damper has internal splines 7 on its inner periphery. These splines 7 mesh, with a circumferential clearance, with external splines 8 formed on the outer periphery of a hub ring 9. This hub ring 9 is fixed to the hub 5, and the cooperating splines constitute a loose coupling means which acts between the damper plate 13 and the hub 5. The hub ring 9 constitutes a flange on the outer periphery of the hub 5, of which it is an integral part.

The torsion damping device also comprises a predamper, which is arranged radially inwardly of the springs 15 of the main damper. This predamper comprises the damper plate 13 of the main damper, together with the hub ring 9 which is part of the hub 5. Circumferentially acting resilient means, which in this example are the helical springs 25 provide a resilient coupling between the damper plate 13 of the main damper and the hub ring 9. For this purpose the damper plate 13 has slots 17 in its inner periphery, and the hub ring 9 has slots 27 in its outer periphery. The slots 17 and 27 lie in facing relationship with each other. The helical springs 25 are located within these slots. In the example shown in the drawings, the predamper has two helical springs 25 arranged diametrically opposite to each other. The springs 25 are less stiff than the springs 15 of the main damper. Centring end thrust inserts 18 and 19 are preferably inserted at each end of the springs 25. The loose coupling means 7, 8 are interrupted by the slots 17 and 27.

The predamper is adapted for absorbing vibrations in the slow running mode of the engine, while the main damper is adapted for absorbing vibrations in the normal running mode, or driving mode, of the vehicle. The dampers include axially acting friction devices which will be described below.

The guide ring 12 is centred by a low friction bearing 20, which in this example is moulded in a suitable plastics material. A cylindrical internal surface 21 of the guide ring 12 cooperates with a complementary cylindrical surface 22 of the bearing 20. This complementary surface 22 surrounds the hub 5, in this example with a radial clearance, and is defined by the outer cylindrical surface of an axial sleeve portion 29. This sleeve portion 29 is an axial extension of the inner edge of a crown portion 35 which extends generally transversely, i.e. radially. The crown portion 35 has two opposed radial surfaces 37 and 38. The surface 37 cooperates with the hub ring 9, while the surface 38 cooperates with the guide ring 12 as shown in FIG. 2. The crown portion 35 forms part of the low friction bearing 20, and it is extended at its periphery by a radially outwardly extending radial plate portion 39, lying in a plane parallel to that of the crown portion 35 but offset axially with respect to the latter. The plate portion 39 of the bearing 20 is formed with axially extending spigots 23, which fit in complementary through holes 24 formed in the damper plate 13, so that the damper plate 13 and the bearing 20 are coupled for rotation together and are centred with respect to each other. The plate portion 39 of the bearing 20 also has, on the side facing towards the damper plate 13, an annular engagement surface 26 which is arranged to bear on the damper plate 13 in its central part, which does not have the internal splines 7.

A friction ring 30 is disposed axially between the guide ring 11 and the damper plate 13. The friction ring 30 has an annular engagement surface 36, which cooperates in frictional engagement with the damper plate 13 in the central part of the latter not having the internal splines 7. The friction ring 30 also has further axial spigots 33 which fit within complementary through holes 34 formed in the guide ring 11, so that the guide ring 11 and the friction ring 30 are coupled for rotation together.

The friction ring 30 is biased axially towards the damper plate 13 by a Belleville ring 28 which bears on the guide ring 11, thus urging the bearing 20, by reaction, into contact with the damper plate 13 and with the hub ring 9, and also urging the guide ring 12 into contact with the surface 38 of the bearing 20.

A second friction ring 31, which surrounds the hub 5, is located axially between the guide ring 11 and the hub ring 9, and radially between the friction ring 30 and the body of the hub 5. The second friction ring 31 has an annular thrust face 32 which cooperates, in frictional contact, with the hub ring 9. A second Belleville ring 45 urges the second friction ring 31 axially towards the hub ring 9, and bears against the guide ring 11.

The two friction rings 30 and 31 are connected together by means of radial arms 41. These arms are flexible in the axial direction, and are separated from each other by circumferential apertures 42 which are best seen in FIG. 4. In this way, the friction rings 30 and 31 are coupled together in rotation while being able to be displaced axially with respect to each other, by virtue of the flexibility of the radial arms 41 in that direction. To this end, the radial arms 41 are slender as can be seen in FIGS. 2 and 4. Thus a single friction member 40, which in this example is made of a moulded material, comprises, integrally with each other, the friction ring 30, the friction ring 31 and the radial arms 41. The axial flexibility of the radial arms 41 enables the friction rings 30 and 31 to be loaded axially, independently of each other, by the separate Belleville rings 28 and 45.

This arrangement enables manufacture and fitting of the assembly to be simplified. In particular, it is not necessary to provide, as was the case hitherto, means for driving the friction ring 31 in rotation by the guide ring 11, which is consequently a component that is simpler to make and also more robust. The member 40 is preferably made of a synthetic mouldable material such as a plastics material. Thus, the friction ring 31 has at its inner periphery an integrally moulded bead for centring the Belleville ring 45.

The torsion damping device operates in a manner which follows from the foregoing description.

In the examples shown, and in particular as shown in FIGS. 3 and 4, there is a circumferential clearance in both directions of rotation between the splines 7 and the splines 8 of the damper plate 13 and the hub 5 respectively. The clearance indicated at 46 in FIG. 3 corresponds for example to a relative rotation of 9 degrees between the damper plate 13 and the hub 5, while the clearance 48 corresponds to relative rotation in the opposite direction and has, for example, an amplitude of 5 degrees.

When the input element 1 and the output element 2 are urged into rotation with respect to each other, in a first phase the less stiff springs, these being in this example the springs 25, become compressed. The damper plate 13 and the guide rings 11 and 12, being coupled together in rotation through the springs 15 of greater stiffness, are displaced together, also driving the friction member 40, that is to say the friction rings 30 and 31, together with the bearing 20. This movement takes place with friction between the crown portion 35 of the bearing 20, through its surface 37, and the hub ring 9 of the hub 5; and with further friction between the surface 32 of the second friction ring 31 and the hub ring 9. This first phase finishes after a rotation of 9 degrees, in the above example, of this movable assembly with respect to the hub 5. At the end of this first phase the internal splines 7 of the damper plate 13 have come into contact with the external splines 8 of the hub 5. The damper plate 13 then becomes locked together with the hub 5 for rotation with it.

The second phase corresponds to the action of the main damper, in which the support disc 2 and the guide rings 11 and 12 continue their rotation with respect to the hub 5 and compress the springs 15, with the hub 5 holding the damper plate 13 of the main damper. The bearing 20 is immobilized by the damper plate 13, while the friction rings 30 and 31 are driven in rotation by the guide ring 11. The friction between the cylindrical surfaces 21, 22, and that between the guide ring 12 and the surface 38 of the crown portion 35 of the bearing 20, are augmented by the friction between the friction rings 30 and 31 and the damper plate 13 on the engagement surface 36, and by the friction of the hub ring 9 of the hub 5 on the surface 32, respectively. This second phase ends when the spacers 14 come into cooperating engagement with the edges of the apertures 16.

In the return direction, the springs 15 expand. The guide rings 11 and 12 carry with them the friction rings 30 and 31, which cooperate in frictional engagement with the damper plate 13 and the hub ring 9, while the guide ring 12 is in frictional cooperation with the bearing 20. These various frictions are maintained until the damper plate 13 is driven by the guide rings 11 and 12 by virtue of the springs 15. The springs 25 then expand, and friction is limited to the cooperation between the hub ring 9 and, on one side the bearing 20 and on the other side the friction ring 31, until the initial or rest position is once again reached.

Reference is now made to FIGS. 5 and 6, which show a modified embodiment of the friction member. In this version, the friction member is indicated at 140, and comprises friction rings 130 and 131, which are connected together through radial arms 141. The radial arms 141 are flexible in the axial direction, and are of a slender configuration. The friction member 140 is made of a material which not only has the qualities required for friction purposes, but which also has an intrinsic elasticity, being moulded in a configuration such as that shown in FIG. 6. In FIG. 6, the second friction ring 131 is in a transverse plane which is not parallel to that in which the first friction ring 130 lies, but makes an angle with that plane, and is for example conical. In this way, in the fitting position shown in FIG. 5, the arms 141 are prestressed, and produce an axial elastic application force which is excited by the ring 131 on the hub ring 9. The Belleville ring 145 in the preceding version is thus able to be omitted, which simplifies the structure even further.

As will have been understood from the foregoing, the splines on the damper plate 13 and the hub ring 9 are bounded by teeth, which in this example are of trapezoidal form. The teeth on the damper plate 13 penetrate, with a clearance, into the splines of the hub ring 9 and vice versa.

The radial arms 41, 141 can of course be brought closer together, and can even be merely in the form of a simple thin film, the apertures 42 then being omitted.

In another version, the axially acting resilient means, instead of consisting of the Belleville rings 28 and 45, may be in the form of corrugated rings.

Finally, as mentioned above, the predamper may be located axially between the guide ring 12 and the damper plate 13, and radially inwardly of the springs 15 of the main damper. It may comprise two secondary guide rings which are mounted at their outer periphery on the bearing 20 for rotation with the latter, and which are located on either side of a secondary damper plate which meshes, without any clearance, with the hub 5.

What is claimed is:

1. A rotary coupling comprising an input element, an output element, and a torsion damping device coupling said input and output elements together, said torsion damping device comprising a main damper associated with the input element so as to be acted on kinematically directly by the input element, and a predamper disposed operatively between the main damper and the output element for directly driving the output element, the output element comprising a hub, the main damper and the predamper comprising, respectively, first and second circumferentially acting resilient means, the main damper further including a damper plate and a pair of guide rings disposed in axial positions on either side of the damper plate in flanking relationship with the damper plate, the guide rings having first apertures, the damper plate having second apertures in facing relationship with the first apertures, the first resilient means being mounted in said first and second apertures so as to act between the guide rings and the damper plate, said second resilient means being less stiff than the first resilient means and mounted operatively between the damper plate and the hub, the main damper and predamper further including, respectively, a first axially acting friction device and a second axially acting friction device, the hub having an outer periphery carrying a hub ring, the hub ring having an outer periphery with external splines formed thereon, the damper plate having an inner periphery formed with internal splines meshing with the external splines of the hub ring, with said splines defining a circumferential clearance between the internal splines and the external splines, said first and second friction devices constituting a single component comprising a first friction ring and a second friction ring surrounded by the first friction ring, the single component further including radial arms flexible in the axial direction and integrally formed with the first and second friction rings to define circumferential apertures discretely disposed about the circumference of said hub, so that the first and second friction rings are rotatable together but able to undergo relative axial displacement.

2. A rotary coupling according to claim 1, wherein the first friction ring is disposed in an axial position between a first one of said guide rings and the damper plate, the second friction ring being disposed in an axial position between the first guide ring and the hub ring, the torsion damping device further including axially acting resilient means biasing the first friction ring towards the damper plate and the second friction ring towards the hub ring.

3. A rotary coupling according to claim 2, wherein the first guide ring is formed with through holes, the first friction ring having axial spigots engaged in the through holes, the axially acting resilient means comprising a first Belleville ring bearing on the first guide ring and on the first friction ring, whereby to urge the first friction ring axially towards the damper plate.

4. A rotary coupling according to claim 3, wherein said axially acting resilient means comprises a second Belleville ring bearing on the first guide ring and on the second friction ring, whereby to urge the second friction ring axially towards the hub ring.

5. A rotary coupling according to claim 3, wherein the radial arms are prestressed, whereby to urge the second friction ring axially towards the hub ring.

6. A rotary coupling according to claim 5, wherein the first friction ring defines a transverse plane, the friction rings being formed by moulding in a position such that the second friction ring defines an angle with the plane.

7. A rotary coupling according to claim 2, wherein a bearing having a first cylindrical surface surrounding the hub is located between the damper plate and one of the guide rings that lies on the other side of the damper plate from the single component, said one of the guide ring having a second cylindrical surface complementary to the first cylindrical surface and cooperating with the first cylindrical surface, whereby the bearing centers said one of the guide rings.

8. A rotary coupling according to claim 7, wherein the damper plate has through holes, the bearing having axial spigots mounted in the through holes in a complementary manner, the bearing further having an annular engagement surface bearing on the damper plate.

9. A rotary coupling according to claim 1, wherein the radial arms are separated from each other by said circumferential apertures and further define radially extending edges of said circumferential apertures.

10. A rotary coupling according to claim 1, wherein the radial arms are continuous with each other so as to constitute only a thin film.

11. A rotary coupling according to claim 1, wherein said radial arms define a thickness in the axial direction that is less than any thickness of both the first and second friction rings, whereby axial flexibility of the radial arms enables the first and second friction rings to be loaded axally independently of each other.

* * * * *